US012713365B2

(12) United States Patent
Dalsgaard et al.

(10) Patent No.: US 12,713,365 B2
(45) Date of Patent: Aug. 18, 2026

(54) BEAM SOURCE ASSISTANCE INFORMATION

(71) Applicant: Nokia Technologies Oy, Espoo (FI)

(72) Inventors: Lars Dalsgaard, Oulu (FI); Anthony Lo, Bristol (GB); Dimitri Gold, Espoo (FI)

(73) Assignee: Nokia Technologies Oy, Espoo (FI)

( * ) Notice: Subject to any disclaimer, the term of this patent is extended or adjusted under 35 U.S.C. 154(b) by 326 days.

(21) Appl. No.: 18/167,917

(22) Filed: Feb. 13, 2023

(65) Prior Publication Data

US 2023/0269678 A1 Aug. 24, 2023

(30) Foreign Application Priority Data

Feb. 23, 2022 (FI) ..................................... 20225166

(51) Int. Cl.
*H04W 56/00* (2009.01)

(52) U.S. Cl.
CPC .............................. *H04W 56/0005* (2013.01)

(58) Field of Classification Search
None
See application file for complete search history.

(56) References Cited

U.S. PATENT DOCUMENTS

2020/0204246 A1 6/2020 Zhou et al.
2020/0351842 A1* 11/2020 Lin ........................ H04B 7/086
2020/0374079 A1* 11/2020 Chervyakov ....... H04L 27/2657
(Continued)

FOREIGN PATENT DOCUMENTS

CN 113179551 A * 7/2021 ........ H04W 72/1273
EP 3297343 A2 3/2018
EP 3855664 A1 7/2021
WO WO-2017173303 A1 * 10/2017 ........ H04W 36/0094
WO 2020/205802 A1 10/2020
(Continued)

OTHER PUBLICATIONS

"3rd Generation Partnership Project; Technical Specification Group Radio Access Network; NR; NR support for high speed train scenario in frequency range 2 (FR2) (Release 17)", 3GPP TR 38.854, V0.3.0, Jan. 2022, pp. 1-91.
(Continued)

*Primary Examiner* — Wutchung Chu
*Assistant Examiner* — Berhanu D Belete
(74) *Attorney, Agent, or Firm* — Brake Hughes Bellermann LLP

(57) ABSTRACT

There is provided an apparatus comprising at least one processor; and at least one memory storing instruction that, when executed by the at least one processor, cause the apparatus, which is configured to communicate on a source transmission configuration indication state, to: receive, from a network using the source transmission configuration indication state, a configuration for a state switch from the source transmission configuration indication state to a target transmission configuration indication state; determine that the apparatus is operated in a high speed train frequency range 2 (HST FR2) scenario; determine whether or not the target state is among active transmission configuration indication states; determine a state switch delay based on determining that the apparatus is operated in the HST FR2 scenario and based on determining whether or not the target state is among active transmission configuration indication states.

14 Claims, 9 Drawing Sheets

(56) References Cited

U.S. PATENT DOCUMENTS

2021/0306864 A1* 9/2021 Park .................... H04B 17/318
2021/0306994 A1* 9/2021 Venugopal ........ H04W 72/0446
2021/0320685 A1* 10/2021 Venugopal ............... H04B 1/62
2022/0070807 A1* 3/2022 Vaze ................... H04L 27/2657
2022/0174766 A1* 6/2022 Zhou ................... H04W 72/044
2022/0322433 A1* 10/2022 Zhang ............... H04W 74/0808
2023/0064231 A1* 3/2023 Haghighat ............ H04L 5/0053
2023/0126659 A1* 4/2023 Petrov ................. H04W 56/001 370/336
2023/0189262 A1* 6/2023 Zeineddine ........... H04L 5/0048 370/329
2024/0349348 A1* 10/2024 Dalsgaard .............. H04B 7/024
2025/0088240 A1* 3/2025 Marcone ................ H04B 7/088

FOREIGN PATENT DOCUMENTS

WO 2020/227139 A1 11/2020
WO WO-2020222285 A1 * 11/2020 ........... H04L 5/0091
WO WO-2021109477 A1 * 6/2021 ........ H04W 74/0808
WO 2021/222219 A1 11/2021

OTHER PUBLICATIONS

"WF on FR2 HST RRM requirements (part 2)", 3GPP TSG-RAN WG4 Meeting # 101-e, R4-2120416, Agenda Item: 8.9.4, Samsung, Nov. 1-12, 2021, 3 pages.

"WF on FR2 HST RRM (part 1)", 3GPP TSG-RAN WG4 Meeting # 101-bis-e, R4-2202594, Agenda Item: 6.9.4, Nokia, Jan. 17-25, 2022, 8 pages.

"WF on uplink timing for FR2 HST", 3GPP TSG-RAN WG4 Meeting # 101-bis-e, R4-2202767, Agenda Item: 6.9.4, Samsung, Jan. 17-25, 2022, pp. 1-3.

"[Draft] LS on network signaling for Rel-17 NR FR2 HST RRM", 3GPP TSG-RAN WG4 Meeting # 101-bis-e, R4-2202765, 3GPP TSG RAN WG4, Jan. 17-25, 2022, 2 pages.

"CR on maintenance on BWP switch requirements on multiple CCs", 3GPP TSG-RAN WG4 Meeting # 98-e, R4-2102722, Huawei, Jan. 25-Feb. 5, 2021, 3 pages.

"3rd Generation Partnership Project; Technical Specification Group Radio Access Network; NR; Physical layer procedures for control (Release 17)", 3GPP TS 38.213, V17.0.0, Dec. 2021, pp. 1-225.

"3rd Generation Partnership Project; Technical Specification Group Radio Access Network; NR; Requirements for support of radio resource management (Release 17)", 3GPP TS 38.133, V17.4.0, Dec. 2021, 3230 pages.

Office action received for corresponding Finnish Patent Application No. 20225166, dated Oct. 25, 2022, 10 pages.

"Discussion about Unified TOI state in FeMIMO", 3GPP TSG-RAN WG4 Meeting # 101b-e, R4-2200787, Agenda Item: 6.19.3.1, Intel Corporation, Jan. 17-25, 2022, 8 pages.

"Discussion on Unified TCI for DL and UL", 3GPP TSG-RAN WG4 Meeting #102-e, R4-2205016, Agenda Item: 10.19.3.1. ZTE Corporation, Feb. 21-Mar. 3, 2022, pp. 1-6.

* cited by examiner

400 receiving, by a user equipment, from a network using the source transmission configuration indication state, a configuration for a state switch from the source transmission configuration indication state to a target transmission configuration indication state

410 determining whether the target state is among active transmission configuration indication states

420 determining that a transmission point of the target state is collocated with a transmission point of the source state, if the target state is among the active transmission configuration indication states; or determining that a transmission point of the target state is not collocated with a transmission point of the source state, if the target state is not among the active transmission configuration indication states

700 transmitting, by a network node to a user equipment, a configuration for a state switch from a source transmission configuration indication state to a target transmission configuration indication state

710 determining state switch delay at the user equipment based on whether or not the target state is among active transmission configuration indication states

BEAM SOURCE ASSISTANCE INFORMATION

RELATED APPLICATIONS

This application claims priority from Finland patent application No. 20225166 filed on Feb. 23, 2022, which is hereby incorporated by reference in its entirety.

FIELD

Various example embodiments relate to beam source assistance information, e.g. in a transmission configuration indication state switch.

BACKGROUND

A network may configure a user equipment with a beam change. When the source beam and the target beam originate from the same transmission point, the situation is referred to as quasi colocation type-D in frequency range 2.

SUMMARY

According to some aspects, there is provided the subject-matter of the independent claims. Some example embodiments are defined in the dependent claims. The scope of protection sought for various example embodiments is set out by the independent claims. The example embodiments and features, if any, described in this specification that do not fall under the scope of the independent claims are to be interpreted as examples useful for understanding various example embodiments.

BRIEF DESCRIPTION OF THE DRAWINGS

FIG. 4 shows, by way of example, a flowchart of a method;

FIG. 7 shows, by way of example, a flowchart of a method;

DETAILED DESCRIPTION

Figure 1:
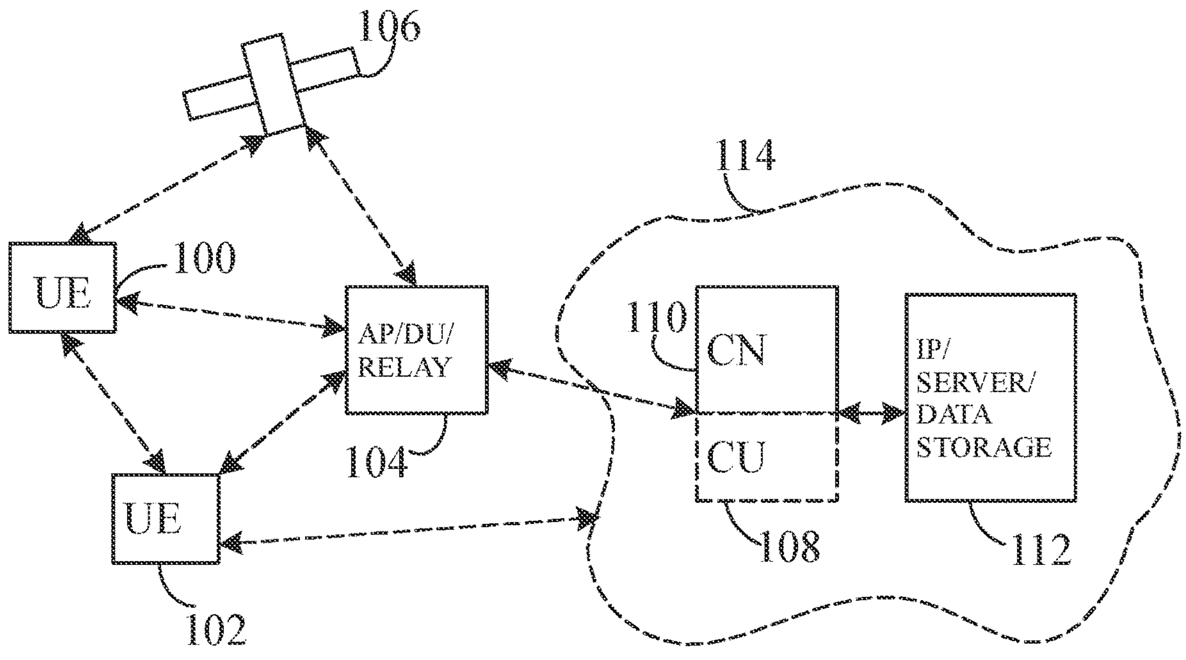
FIG. 1 shows, by way of example, a network architecture of communication system.

FIG. 1 shows, by way of an example, a network architecture of communication system. In the following, different exemplifying embodiments will be described using, as an example of an access architecture to which the embodiments may be applied, a radio access architecture based on long term evolution advanced (LTE Advanced, LTE-A) or new radio (NR), also known as fifth generation (5G), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

The example of FIG. 1 shows a part of an exemplifying radio access network. FIG. 1 shows user devices 100 and 102 configured to be in a wireless connection on one or more communication channels in a cell with an access network node, such as gNB, i.e. next generation NodeB, or eNB, i.e. evolved NodeB (eNodeB), 104 providing the cell. The physical link from a user device to the network node is called uplink (UL) or reverse link and the physical link from the network node to the user device is called downlink (DL) or forward link. It should be appreciated that network nodes or their functionalities may be implemented by using any node, host, server or access point etc. entity suitable for such a usage. A communications system typically comprises more than one network node in which case the network nodes may also be configured to communicate with one another over links, wired or wireless, designed for the purpose. These links may be used for signalling purposes. The network node is a computing device configured to control the radio resources of the communication system it is coupled to. The network node may also be referred to as a base station (BS), an access point or any other type of interfacing device including a relay station capable of operating in a wireless environment. The network node includes or is coupled to transceivers. From the transceivers of the network node, a connection is provided to an antenna unit that establishes bi-directional radio links to user devices. The antenna unit may comprise a plurality of antennas or antenna elements. The network node is further connected to core network 110 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc. An example of the network node configured to operate as a relay station is integrated access and backhaul node (IAB). The distributed unit (DU) part of the IAB node performs BS functionalities of the IAB node, while the backhaul connection is carried out by the mobile termination (MT) part of the IAB node. UE functionalities may be carried out by IAB MT, and BS functionalities may be carried out by IAB DU. Network architecture may comprise a parent node, i.e. IAB donor, which may have wired connection with the CN, and wireless connection with the IAB MT.

The user device, or user equipment UE, typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IOT) network which is a scenario in which objects are provided with the ability to transfer data over a network without requiring human-to-human or human-to-computer interaction.

Additionally, although the apparatuses have been depicted as single entities, different units, processors and/or memory units (not all shown in FIG. 1) may be implemented inside these apparatuses, to enable the functioning thereof.

5G enables using multiple input-multiple output (MIMO) technology at both UE and gNB side, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 7 GHz, cmWave and mm Wave, and also being integratable with existing legacy radio access technologies, such as the LTE. Below 7 GHz frequency range may be called as FR1, and above 24 GHz (or more exactly 24-52.6 GHz) as FR2, respectively. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 7 GHZ—cmWave, below 7 GHz—cmWave—mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The communication system is also able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloud RAN architecture enables RAN real time functions being carried out at the RAN side (in a distributed unit, DU 104) and non-real time functions being carried out in a centralized manner (in a centralized unit, CU 108).

5G may also utilize satellite communication to enhance or complement the coverage of 5G service, for example by providing backhauling. Possible use cases are providing service continuity for machine-to-machine (M2M) or Internet of Things (IOT) devices or for passengers on board of vehicles, or ensuring service availability for critical communications, and future railway/maritime/aeronautical communications. Satellite communication may utilise geostationary earth orbit (GEO) satellite systems, but also low earth orbit (LEO) satellite systems, in particular mega-constellations (systems in which hundreds of (nano) satellites are deployed). Each satellite 106 in the constellation may cover several satellite-enabled network entities that create on-ground cells. The on-ground cells may be created through an on-ground relay node 104 or by a gNB located on-ground or in a satellite.

High speed train (HST) FR2 scenario refers to offering high quality communication access to passengers on a high speed train. For operations at higher carrier frequencies both UE and network make use of directional antennas to ensure good enough link budget to enable a reasonable cell range and link quality. Use of directional antennas may be referred to as beam forming. When applying beam forming at network and UE side, the DL coverage, i.e. transmission coverage from a network node, such as gNB, covers a limited area and the UE reception is limited to within a certain limited coverage area. Although HST on FR2 is used as an example in the description, the embodiments are applicable to other use cases as well, e.g. UE moving in any communication environment where downlink coverage is provided via beams and where the serving beam changes as the UE moves.

Hence, it becomes important that UE and network beams are aligned and that there is a common understanding on at least which DL beam from network is used for scheduling. On UE side there is more freedom for UE to autonomously change its spatial reception setting, i.e. Rx beam forming, in order to optimize the UE Rx gain. For example, if the UE rotates it may benefit from adjusting its Rx spatial setting to better align the Rx beam with the currently used gNB transmission beam, which is controlled by the network.

Figure 2A:
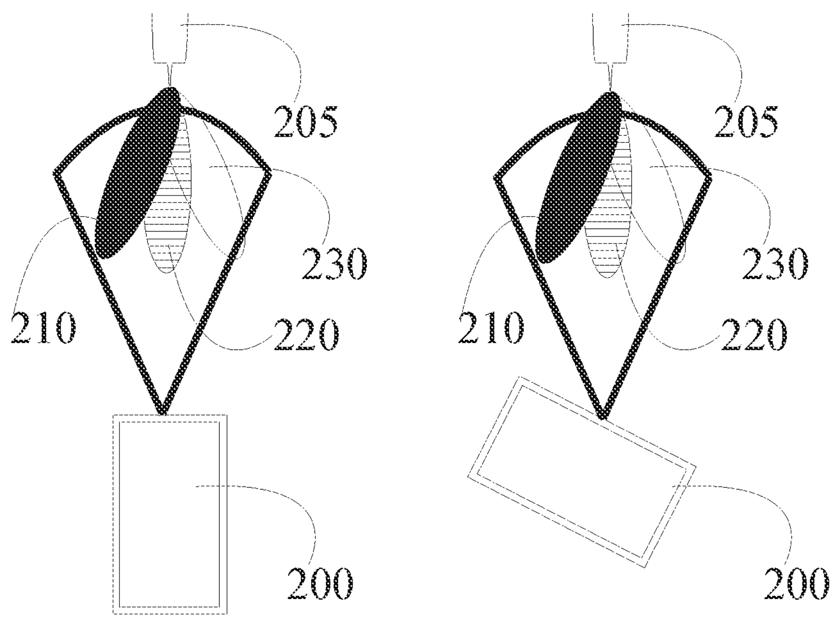
FIG. 2*a* shows, by way of example, a user equipment connected to a network.

FIG. 2*a* shows, by way of example, a user equipment connected to a network. The UE 200 is connected to the cell 205, e.g. gNB, which applies three different DL beams 210, 220, 230 in order to ensure cell coverage. The network may use more DL beams and coverage may be different than illustrated in the example of FIG. 2*a*. UE 200 is connected to the network using DL Beam #2 220. This is enabled by UE performing and reporting beam level measurement, e.g., layer 1 reference signal received power (L1-RSRP), to the network which then requests the UE to use one of the DL beams, in this case Beam #2 220. The request from the network may be, for example, transmission configuration indication (TCI) state switch command. In the right-side illustration, it is shown that the UE 200 has rotated while it has not moved its location relative to the gNB. Based on the UE measurements and reporting, the network has not requested the UE to switch DL beam. The UE may have autonomously, based on own internal algorithm, changed from one DL spatial setting (Rx beam setting) to another. The UE may have changed the active panel used on the UE side, if the UE has more than one panel.

Figure 2B:
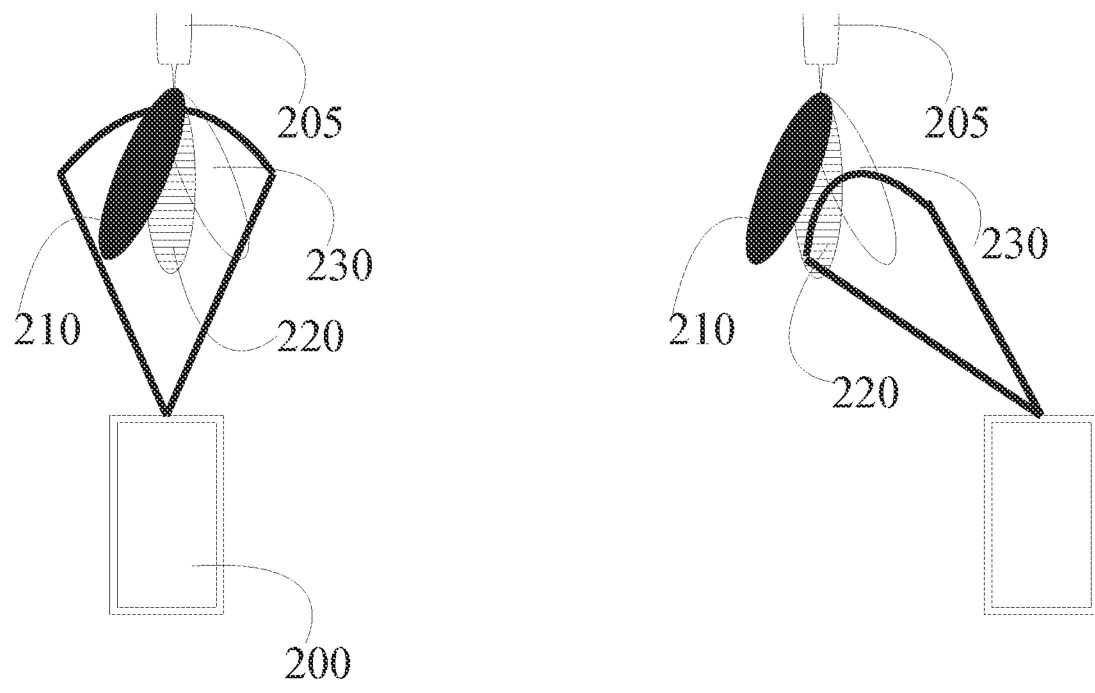
FIG. 2*b* shows, by way of example, a user equipment connected to a network.

FIG. 2*b* shows, by way of example, a user equipment connected to a network. In the illustration on the left side, the UE 200 is connected to the network 205 using DL Beam #2 220. The UE 200 then moves relative to the cell 205, e.g. gNB. Based on the UE beam measurements, e.g. L1-RSRP, which are reported from the UE to the network, the network may evaluate that the UE is better served by the network if using DL Beam #3 230. Hence, the network orders a beam change, i.e. TCI state change or switch, from DL Beam #2 220 to DL Beam #3 230. Result is that the UE 200 switches the DL beam from DL Beam #2 220 in the left illustration to use DL Beam #3 230 in the right illustration. The network may order the beam change via TCI state change command, for example, The UE beam switch operation assumes that the physical locations of a transmission point, or the source or origin of the current beam (e.g., Beam #2) and the target beam (e.g., Beam #3) are the same. This is referred to as collocated or Quasi Co Location (QCL) Type-D in FR2.

Figure 3:
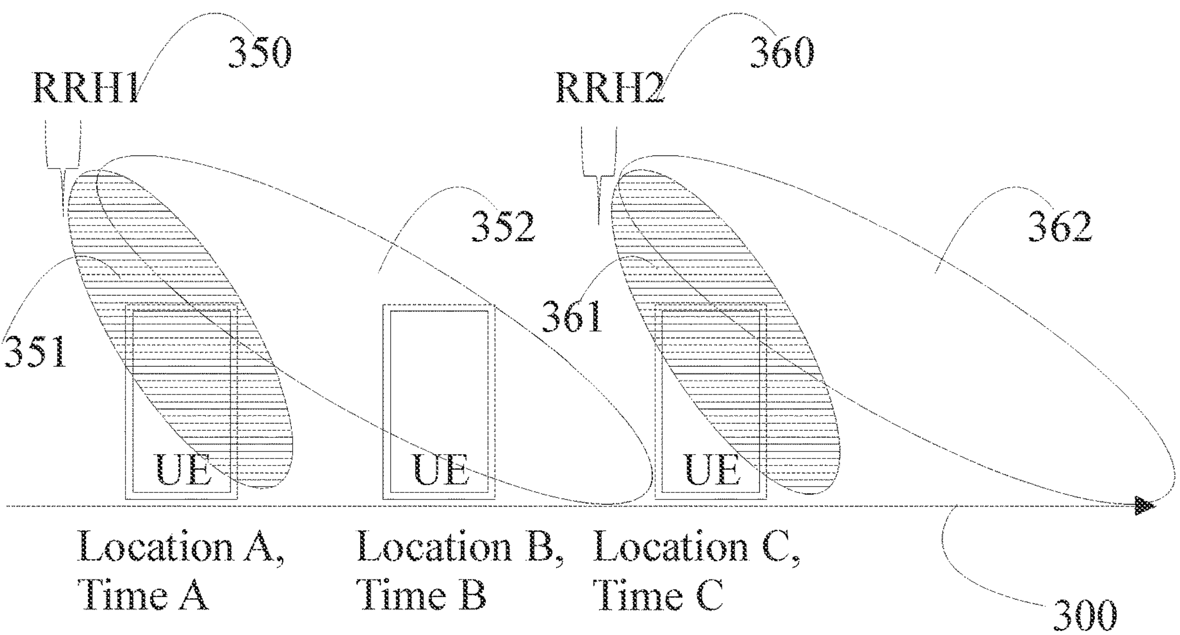
FIG. 3 shows, by way of example, user equipment UE on different locations on a train track.

FIG. 3 shows, by way of example, user equipment UE on different locations on a train track 300. Let us consider a train track scenario, wherein the base station extends cell coverage along the train track by using several remote radio heads (RRHs), e.g. RRH1 350 and RRH2 360, which are connected to a baseband unit (BBU). The RRHs 350, 360, which are connected to the same BBU, are seen from the UE point of view as belonging to the same cell. Each RRH may make use of one or more DL beams. RRH1 350 may use beams 351, 352, for example. RRH2 360 may use beams 361, 362, for example. As the UE, or a customer premises equipment (CPE), travels along the train track 300 the UE will have to be served by different beams from different RRHs. Hence, in FR2 the change between the RRHs of the same cell may be done using beam switching, i.e. TCI state change, based on UE measurements, e.g. L1-RSRP, and reporting. It should be noted that while FR2 is as example the sample principles may also apply to other frequency ranges—e.g., FR1 or FR3 (52.6 GHz-71 GHz).

The UE moves from left to right along the train track. The UE is initially at location A and at a time A is served by RRH1 350 and Beam #1 351. RRH1 may belong to cell A, for example. As the UE travels along the track 300 the UE will enter the coverage area of DL Beam #2 352 and UE will measure and report DL Beam #2 352. At some point, the network will request the UE to change from using DL Beam #1 351 to use DL Beam #2 352 by a TCI state change.

The Beam #1 351 and Beam #2 352 involved in the TCI state change are having the same source or transmission point 350, that is, they are collocated. Thus, the change in a propagation delay with respect to the transmission point 350 is gradual or minor and may be easily tracked by the UE.

If the UE is not able to track the timing, the network may compensate the timing difference by means of a timing advance (TA) command. However, as the source of the two beams involved in the beam switch is the same (collocated), there is no significant time difference in DL timing, or propagation delay, from using Beam #1 351 and Beam #2 352 when the TCI state change happens as these beams have the same source, and hence, distance and DL/UL path may be assumed to be similar enough. The UE may readily use the DL and UL timing that were used with respect to Beam #1 351 in Beam #2 352. In other words, it may be assumed that when UE changes from RRH1, Beam #1 351 to RRH1, Beam #2 352, the DL (and UL) timing of Beam #1 351 and Beam #2 352 are the same, or at least close to each other so that the UE can track the DL and UL timing by legacy mechanisms. Legacy mechanisms depend on the size of the propagation delay difference, and may refer to gradual timing adjustment, as specified in 3GPP TS 38.133, section 7.1.2.1, or the maximum timing adjustment that may be signaled by timing adjustment or advance command (TAC), for example.

However, it may be that the sources or transmission points of the beams involved in the beam switch, i.e. TCI state change, are non-collocated. For example, in FR2 HST scenario, this may be the case. The UE at location C may change DL beam from RRH1, Beam #2 352 to RRH2, Beam #1 361. Then, the assumption of re-using the same DL/UL timing in the source beam and the target beam after beam change does not hold. Reason for this is that the origin of the DL beams, and assumed UL beam, is physically different and hence there may be a significant difference in the DL propagation delay, and thereby UL propagation delay, between the two beams, i.e. Beam #2 352 of RRH1 350 and Beam #1 361 of RRH2 360. This timing difference might not be alleviated by legacy mechanisms.

A change in the DL timing also impacts the UE UL timing as the UL timing is based on the DL timing of serving beam. Hence, a large jump in DL timing leads to a large jump in UL timing.

The UE may be allowed to perform a large one time adjustment of the UL timing. Based on this adjustment, the UE UL timing would be adjusted after a beam change and there would be no further changes needed. However, e.g, due to the lack of testing capabilities for this mechanism, the network may enable or disable such UE one shot large UL timing adjustment. If the network indicates, e.g. using a flag, to the UE that the UE is allowed a large one step timing adjustment the UE will autonomously adjusts its UL transmit timing when a large time jump is experienced. For example, a large time jump may be experienced in TCI state switch between beams of non-collocated RRHs.

However, some UEs might not be able to track the timing of the target beam when assuming such beam is not collocated with the current serving source beam. Some UEs might not be able to reliably determine based on DL timing difference whether the source beam and the target beam are collocated or not. For example, DL timing measurements may be performed infrequently at the UE side.

A method is provided for UE to reliably conclude whether or not a transmission point of a target beam is collocated with a transmission point of a current active source beam.

Figure 4:
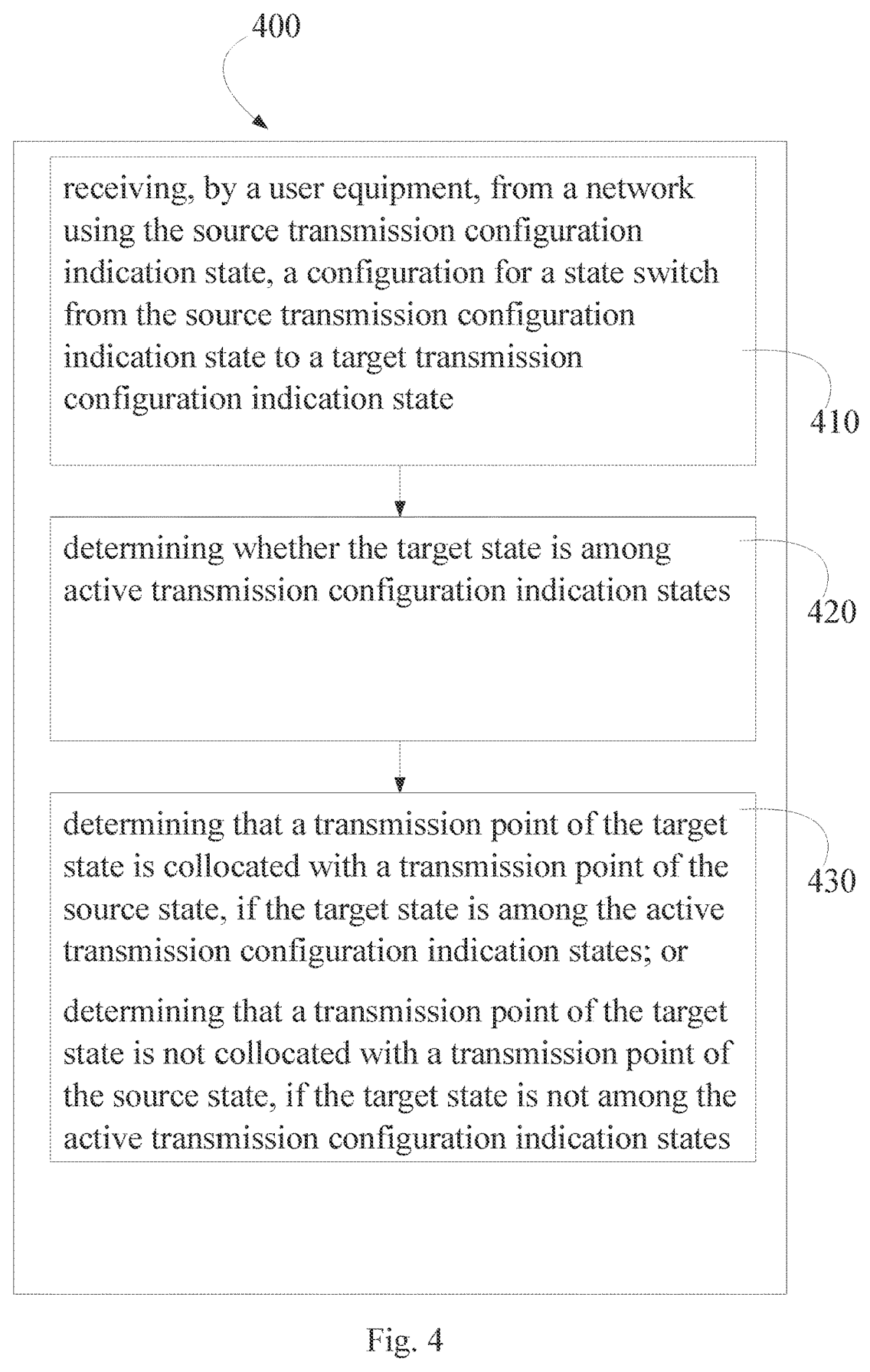

FIG. 4 shows, by way of example, a flowchart of a method. The method may be performed by a user equipment, or by a control device configured to control the functioning thereof, when installed therein. The method 400 comprises receiving 410, by a user equipment, from a network using the source transmission configuration indication state, a configuration for a state switch from the source transmission configuration indication state to a target transmission configuration indication state. The method 400 comprises determining 420 whether the target state is among active transmission configuration indication states. The method 400 comprises determining 430 that a transmission point of the target state is collocated with a transmission point of the source state, if the target state is among the active transmission configuration indication states; or determining that a transmission point of the target state is not collocated with a transmission point of the source state, if the target state is not among the active transmission configuration indication states.

The method(s) as disclosed herein enable(s) the UE to conclude whether or not a transmission point of a target beam is collocated with a transmission point of a current active source beam without introducing new signalling.

A TCI state represents a beam. A beam is formed through transmissions of synchronization signal blocks (SSBs) or reference signals, such as CSI-RSs by the network using one of the RRHs.

The UE is aware of the active TCI states, which are configured by the network. The network may add or remove TCI state(s) from the list of active TCI states. The list of active TCI states may comprise one or more active states.

Let us consider a physical downlink control channel (PDCCH) TCI state change and how downlink control information (DCI) based TCI state change may be handled, for example for FR2 HST train scenario.

If the target TCI state is known, upon receiving physical downlink shared channel (PDSCH) carrying medium access control (MAC) control element (CE) (MAC-CE) activation command in slot n, UE may be able to receive PDCCH with target TCI state of the serving cell on which TCI state switch occurs at the first slot that is after slot $$n + T_{HARQ} + 3N_{slot}^{subframe,\mu} + TO_k * (T_{first-SSB} + T_{SSB-proc})/NR \text{ slot length.}$$

The UE may be able to receive PDCCH with the old TCI state until slot $$n + T_{HARQ} + 3N_{slot}^{subframe,\mu}.$$

$T_{HARQ}$ is the timing between DL data transmission and slot acknowledgement.

The UE may determine whether the target TCI state is in the active TCI state list configured by the network. If the target TCI state is in the list of the active states, the target beam and the current beam are collocated. If the target TCI state is not in the list of the active states, the target beam and the current beam are not collocated. As the network may add or remove TCI state(s) from the list of active TCI states, the network can control UE's actions with respect to time adjustment.

The UE may be indicated by the network whether the UE may assume that if the target TCI state is in the list of the active states, the target beam and the current beam are collocated. If the target TCI state is not in the list of the active states, the target beam and the current beam are not collocated.

The indication from the network may be, for example, done by RRC signaling or other signaling means. It may also be determined based on deployment. E.g. if in a high speed train (HST) scenario, if the UE receives information element (IE) 'highSpeedMeasFlagFR2-r17', the UE may consider that as the indication. That is, the 'highSpeedMeasFlagFR2-r17' may indicate to the UE that it shall support enhanced requirements. It may, additionally, indicate to the UE that the UE may determine the collocation and/non-collocation of the current beam and the target beam based on presence of the target beam in the list of the active beams. In another example, the indication may be based on UE type. E.g., a UE power class 6 (PC6) may consider that it is allowed/configured to assume that if the target TCI state is in the list of the active states, the target beam and the current beam are collocated and if the target TCI state is not in the list of the active states, the target beam and the current beam are not collocated.

Thus, the UE may be indicated explicitly or implicitly whether the UE may determine the collocation and/or non-collocation of the current beam and the target beam based on presence of the target beam in the list of the active beams.

For example, $TO_k$=1 if 'highSpeedMeasFlagFR2-r17' is indicated, and if target TCI state is not in the active TCI state list for PDSCH. Otherwise $TO_k$=0, i.e. if the target TCI is in the active TCI state list.

When $TO_k$=1, or some other positive non-zero number, the UE is given more time for the TCI state switch.

That is, if the beams are collocated, there is no significant TCI state switch delay. If the beams are not collocated, there is a TCI state switch delay due to UE needing additional time for time and/or frequency tracking in the target state. The UE may be allowed additional relaxation at beam switch.

As another example:

If 'highSpeedMeasFlagFR2-r17' is indicated, and if target TCI state is not in the active TCI state list for PDSCH:

If 'largeOneStepUL-timingFR2-r17' is enabled:

If (DL) time difference between source and target TCI state is larger than threshold and if UE needs time tracking in target TCI state, $TO_k$=1. Otherwise, $TO_k$=0

If 'largeOneStepUL-timingFR2-r17' is not enabled and if UE needs time tracking, $TO_k$=1. Otherwise, $TO_k$=0. When the large UL timing adjustment is disabled, the UE shall not transmit e.g., periodic UL until UE has acquired and applied valid timing advance.

Otherwise, i.e. if the 'highSpeedMeasFlagFR2-r17' is not indicated: $T_{first-SSB}$ is time to first SSB transmission after MAC CE command is decoded by the UE; The SSB shall e.g., be the QCL-TypeA or QCL-TypeC to target TCI state; $T_{SSB-proc}$=2 ms; $TO_k$=1 if target TCI state is not in the active TCI state list for PDSCH, and $TO_k$=0 if the target TCI state is in the active TCI state list.

Let us assume that one SSB burst is enough for the UE. Otherwise, the UE may be allowed more time. If the target TCI state is known, upon receiving PDSCH carrying MAC-CE activation command in slot n, UE shall be able to receive PDCCH with target TCI state of the serving cell on which TCI state switch occurs at the first slot that is after slot $$n + T_{HARQ} + 3N_{slot}^{subframe,\mu} + TO_k * (T_{first-SSB} + T_{SSB-proc})/NR$$

length. The UE shall be able to receive PDCCH with the old TCI state until slot $$\text{slot } n + T_{HARQ} + 3N_{slot}^{subframe,\mu}.$$

$T_{HARQ}$ is the timing between DL data transmission and acknowledgement. $T_{first-SSB}$ is time to first SSB transmission after MAC CE command is decoded by the UE; The SSB shall e.g. be the QCL-TypeA or QCL-TypeC to target TCI state; $T_{SSB-proc}$=2 ms; $TO_k$=1 if target TCI state is not in the active TCI state list for PDSCH, $TO_k$=0 otherwise, i.e. if target TCI state is in the active TCI state list.

If the UE is indicated in the cell that the UE may determine the collocation and/or non-collocation of the current beam and the target beam based on presence of the target beam in the list of the active beams, e.g. by highSpeedMeasFlagFR2-r17, and if the target TCI state is known, upon receiving PDSCH carrying MAC-CE activation command in slot n, UE shall be able to receive PDCCH with target TCI state of the serving cell on which TCI state switch occurs at the first slot that is after slot $$n + T_{HARQ} + 3N_{slot}^{subframe,\mu} + TO_k * ([x] * T_{first-SSB} + T_{SSB-proc})/NR \text{ slot length.}$$

The UE shall be able to receive PDCCH with the old TCI state until slot $$n + T_{HARQ} + 3N_{slot}^{subframe,\mu}.$$

$T_{HARQ}$ is the timing between DL data transmission and acknowledgement.

For example, $TO_k$=1 if target TCI state is not in the active TCI state list for PDSCH, otherwise $TO_k$=0, i.e. if the target TCI state is in the active TCI state list. x=the number of reference signals.

As another example, if target TCI state is not in the active TCI state list for PDSCH: x=the number of reference signals, and if 'largeOneStepUL-timingFR2-r17' is enabled and if (DL) time difference between source and target TCI state is larger than threshold, and if UE needs time tracking in target TCI state, $TO_k$=1. Otherwise, $TO_k$=0, i.e. if the UE does not need time tracking.

If 'one shot timing adjustment' is not enabled, and if UE needs time tracking, $TO_k$=1. Otherwise, $TO_k$=0, i.f. if the UE does not need time tracking. If 'one shot timing adjustment' is disabled, UE shall not transmit e.g., periodic UL until UE has applied valid timing advance.

Let us assume that there are multiple SSB bursts and reference signals (RSs). If UE, e.g., by use of highSpeedMeasFlagFR2-r17, is indicated in the cell, and if the target TCI state is unknown, upon receiving PDSCH carrying MAC-CE activation command in slot n, UE shall be able to receive PDCCH with target TCI state of the serving cell on which TCI state switch occurs at the first slot that is after slot $$n + T_{HARQ} + 3N_{slot}^{subframe,\mu} + T_{L,1-RSRP} + TO_k * \{\max((T_{first-SSB} + T_{SSB-proc}), (T_{first-RS} + T_{RS-proc}))\}/NR \text{ slot length.}$$

The UE shall be able to receive PDCCH with the old TCI state until slot $$n + T_{HARQ} + 3N_{slot}^{subframe,\mu}.$$

$T_{HARQ}$ is the timing between DL data transmission and acknowledgement.

For example, $TO_k$=1 if target TCI state is not in the active TCI state list for PDSCH, otherwise $TO_k$=0, i.e. if the target TCI state is in the active TCI state list.

As another example, if target TCI state is not in the active TCI state list for PDSCH and if 'largeOneStepUL-timingFR2-r17' is enabled, and if (DL) time difference between source and target TCI state is larger than threshold, and if UE needs time tracking in target TCI state, $TO_k$=1. Otherwise, $TO_k$=0, i.e. if the UE does not need time tracking.

If 'one shot timing adjustment' is not enabled and if UE needs time tracking, $TO_k$=1. Otherwise, $TO_k$=0, i.e. if the UE does not need time tracking. If 'one shot timing adjustment' is disabled, the UE shall not transmit periodic UL until UE has applied valid timing advance.

Figure 5:
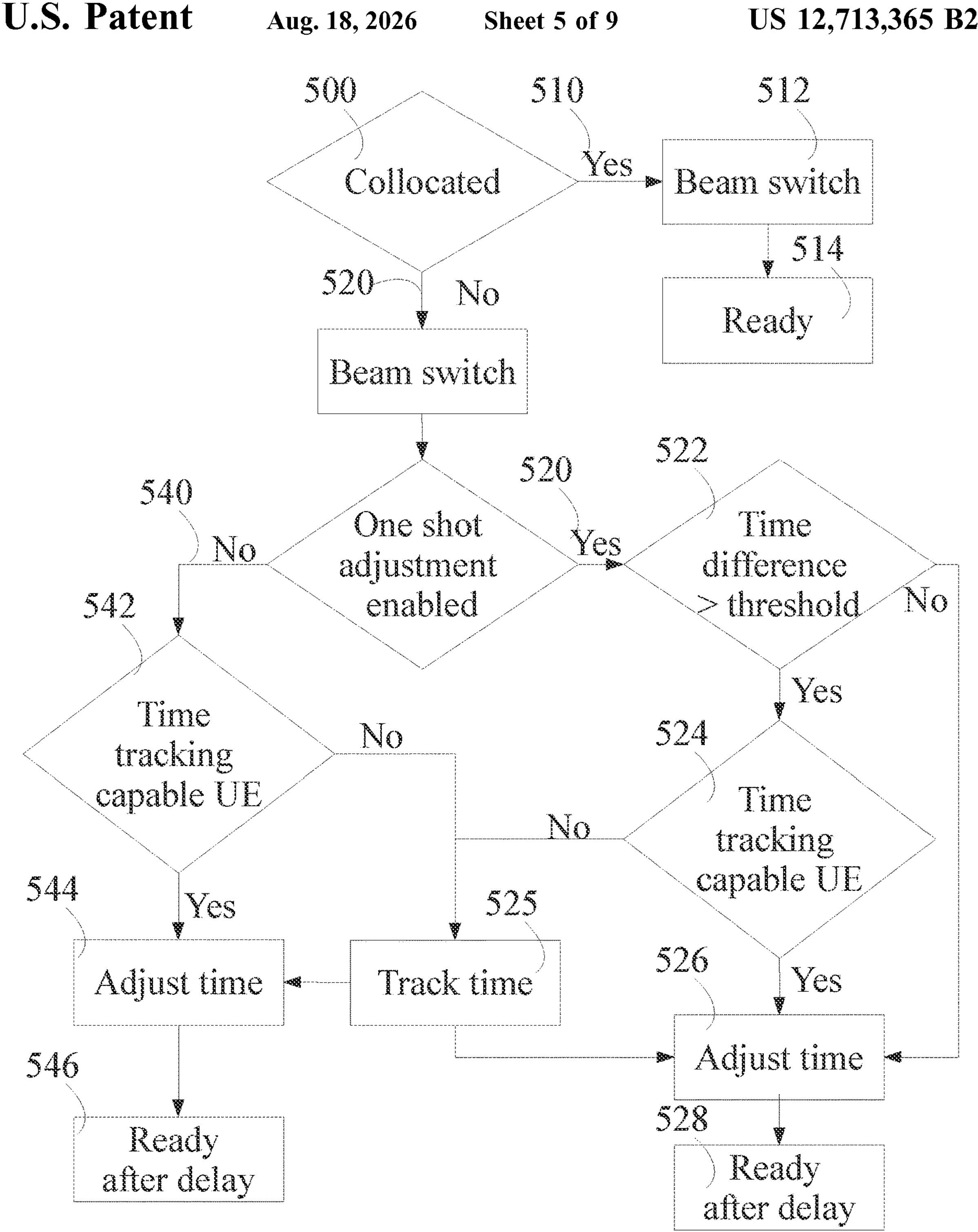
FIG. 5 shows, by way of example, a flowchart of a method.

FIG. 5 shows, by way of example, a flowchart of a method. The UE may be configured to communicate on a current active TCI state, i.e. a current beam or a source beam. The UE may receive a configuration for a state switch, e.g. via TCI state switch command, to change from the current TCI state (also called as a source TCI state or a source beam) to a target TCI state. The configuration is received from the network using the current active TCI state.

The network may have indicated to the UE, implicitly or explicitly as described above, that the UE can determine whether the source or the transmission point of the target state is collocated with the source or the transmission point of the current state based on determining whether the target state is among the active TCI states. Thus, the UE may assume that any potential target TCI state, which is not included in the active TCI state list, may be considered as being not collocated with the source of the current serving TCI state. The network may indicate to the UE whether this method is applied or not. For example, the network may indicate in RRC signalling that UE can or cannot assume that if the target TCI state is not in the list of active TCI states, then the source of the target TCI state can be assumed not being collocated with the source of the current serving TCI state.

Alternatively, the UE may assume that any potential target TCI state, which is included in the active TCI state list, may be considered as being collocated with the source of the current serving TCI state. The network may indicate to the UE whether this method is applied or not. For example, the network may indicate in RRC signaling that UE can or cannot assume that if the target TCI state is in the list of active TCI states, then the source of the target TCI state can be assumed being collocated with the source of the current serving TCI state.

In another alternative the UE may assume that any potential target TCI state, may be considered as being not collocated with the source of the current serving TCI state. The network may indicate to the UE whether this method is applied or not. For example, the network may indicate in RRC signaling that UE can or cannot assume that any target TCI state can be assumed being not collocated with the source of the current serving TCI state.

When the UE receives a TCI state switch command, the UE will check 500 if the target TCI state is part of the active TCI state list.

If the target TCI state is included in the active TCI state list, the UE assumes that the TCI state is collocated 510 with the current serving TCI state. UE performs the TCI state switch 512 and current UE beam switch behavior and requirements apply. Network may assume that the UE may be scheduled according to existing timing requirements and delay, such as specified in 3GPP TS 38.133. The UE is ready 514 for communication on the target state after TCI state switch delay close to 0.

If the target TCI state is not part of the active TCI state list, the UE assumes that the TCI state is not collocated 520 with the current serving TCI state.

If the network has indicated that one-shot large UL transmit timing adjustment is allowed 520, the UE may optionally check 522 if the receive timing difference between serving TCI state and the target TCI state is larger than a certain threshold. The threshold may be predetermined.

In an embodiment, the one-shot UL timing adjustment is an adjustment beyond a threshold limit, e.g. $T_q$. The threshold limit may be either an existing gradual timing adjustment or another defined threshold. In the gradual timing adjustment, the UE may correct the timing gradually, where each adjustment is smaller than the threshold limit.

If the receive timing difference is not larger than the threshold, or if the UE does not check the time difference, the UE may proceed with the beam switch applying time adjustment. The time adjustment may be performed according to existing gradual timing adjustment specified in section 7.1.2.1, 3GPP TS 38.133, for example.

If the receive timing difference is larger than the threshold, the UE checks 524 whether it is capable of fine time tracking. A UE capable of fine time tracking (type-1) in the target TCI state, which is not collocated with current serving TCI state, may autonomously adjust 526 the UE timing, e.g. one or both the UL timing and DL timing. UE is ready 528 after TCI state switch delay 1.

A UE which is not capable (type-2) of fine time tracking in the target TCI state, which is not collocated with current serving TCI state, will receive one or more reference signal for ensuring fine time/frequency tracking 525 in the target TCI state. The UE may have switched the TCI state, or the UE have not yet switched the TCI state. Then, the UE adjusts 526 the UE timing, e.g. both the UL timing and DL timing, according to the one shot adjustment. UE is ready 528 after TCI switch delay 2. The delay 2 may be longer than the delay 1.

Thus, in an embodiment, the UE is ready to receive and transmit in the new TCI state, or target TCI state, after either TCI switch delay 1 or 2, depending on UE type.

In case the network has not indicated 540 that one shot large UL transmit timing adjustment is allowed, the UE may apply existing uplink timing adjustment or UL timing acquisition, e.g. Random Access (RA) based mechanism. The UE may check if the receive timing difference between serving TCI state and the target TCI state is larger than a certain threshold.

The UE checks 542 whether it is capable of fine time tracking. A type-1 UE capable of fine time tracking in the target TCI state, which might not be collocated with current serving TCI state, may autonomously adjust 544 the UE timing, e.g. one or both the UL timing and DL timing. UE is ready 546 after TCI state switch delay 1.

A type-2 UE which is not capable of fine time tracking in the target TCI state, which might not be collocated with current serving TCI state, may need to receive one or more reference signal for ensuring fine time/frequency tracking 525 in the target TCI state. The UE may have switched the TCI state, or the UE have not yet switched the TCI state. Then, the UE adjust 544 the UE timing, e.g. both the UL timing and DL timing. UE is ready 546 after TCI state switch delay 2. The delay 2 may be longer than the delay 1.

UE is ready to receive and transmit in the new TCI state, or target TCI state, after either TCI switch delay 1 or 2, depending on UE type. However, in some examples, e.g., in 546, the UE is not allowed to transmit other than preamble, e.g., Random Access Channel (RACH) preamble. E.g., if the network has indicated that one-shot adjustment is not allowed e.g., while the target beam is not collocated to source beam, the UE shall wait for UL timing acquisition e.g. by use of random access procedure.

The method as disclosed herein enables the network to indicate to the UE whether the target TCI state is collocated with the current serving TCI state. The UE may determine this based on determining whether the target TCI state is among the active TCI states. If the target TCI state is among the active states, meaning that the target TCI state and the current serving TCI state are collocated, the TCI state switch delay is equal to the existing TCI state switch delay. Thus, no additional delay is allowed, or caused, in this case.

If the target TCI state is not among the active states, it means that the target TCI state and the current service TCI state are not collocated. As another example, the UE may have been configured or indicated (explicitly or implicitly) to assume that any potential target TCI state is considered as being not collocated with the current state. In this case, the UE is allowed additional time for time/frequency tracking in the target TCI state, if the UE needs such additional time. In addition, the network is aware that UE may need this additional time for tracking. If the UE does not need additional time for time/frequency tracking in the target TCI state, it still benefits from faster capability because the switch delay is shorter, and the network is aware of that the UE is not in need of additional time for time/frequency tracking in the target TCI state and hence, can perform TCI change faster.

Figure 6:
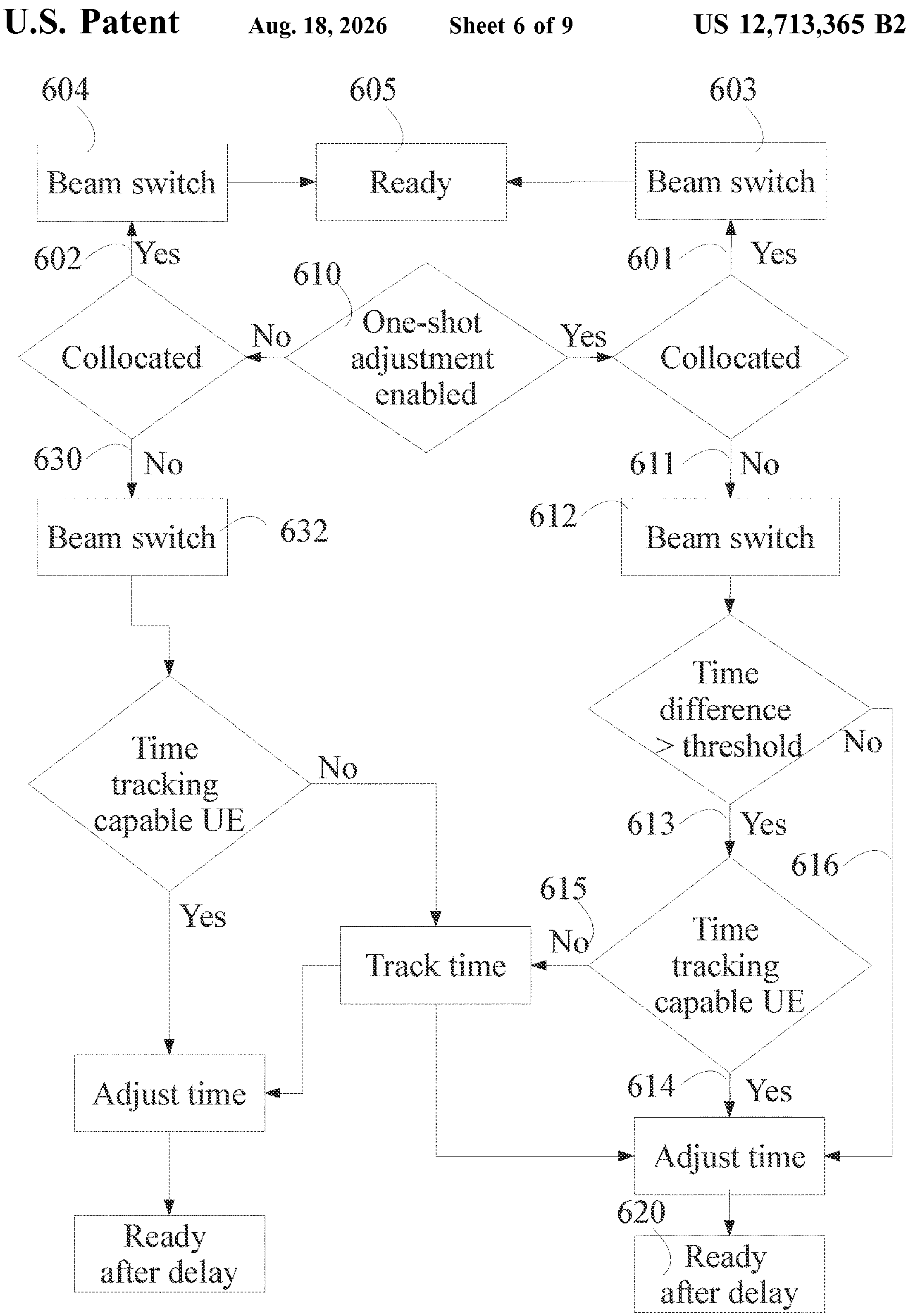
FIG. 6 shows, by way of example, a flowchart of a method.

FIG. 6 shows, by way of example, a flowchart of a method. The network may have indicated 610 whether the UE can use one-time or one-shot UL timing adjustment, i.e. one-shot large UL timing adjustment. In an embodiment, the one-shot UL timing adjustment is an adjustment beyond a threshold limit, e.g. $T_q$. The threshold limit may be either an existing gradual timing adjustment or another defined threshold. In the gradual timing adjustment, the UE may correct the timing gradually, where each adjustment is smaller than the threshold limit.

Upon determining that the source of the target state is collocated 601, 602 with the source of the current active state, the UE performs the state switch or beam switch 603, 604 applying current requirements. The current, or existing, requirements may be those specified in 3GPP TS 38.133. For example, the UE assumes that the timing of the target TCI state is the same as the timing of the current TCI state. That is, the UE may assume that the timing of the current TCI state is applicable and may be applied or re-used in the target TCI state, without any need for additional time tracking.

When the UE is ready 605, the UE may continue the data communication with the source of the target state at a first time instant. The switch delay is negligible, e.g. almost zero.

Upon determining that the source of the target is not collocated 611 with the source of the current active TCI state, and the one-shot adjustment is enabled, the UE may perform the beam switch 612 applying the one-time UL time adjustment. For example, the UE may be allowed to perform the one-time UL time adjustment, if the DL timing difference between the current active state and the target state is larger than a predetermined threshold 613.

If the UE is capable 614 of fine time tracking in the target state before the state switch, the UE may autonomously perform the timing adjustment.

If the UE is not capable 615 of fine time tracking, the UE performs the tracking via receiving one or more reference signals for fine time tracking. Then, the UE may adjust the uplink timing based on the received one or more reference signals.

If the difference is smaller 616 than the threshold, then the existing gradual timing adjustment apply.

The UE may continue the data communication with the source of the target state after a state switch delay 1 or 2, depending on whether the UE is capable of fine time tracking or not.

Upon determining that the source of the target state is not collocated 630 with the source of the current active TCI state, and the one-shot adjustment is disabled, the UE may perform the beam switch 632 applying uplink timing adjustment either autonomously or based on one or more reference signals received from the network.

Figure 7:
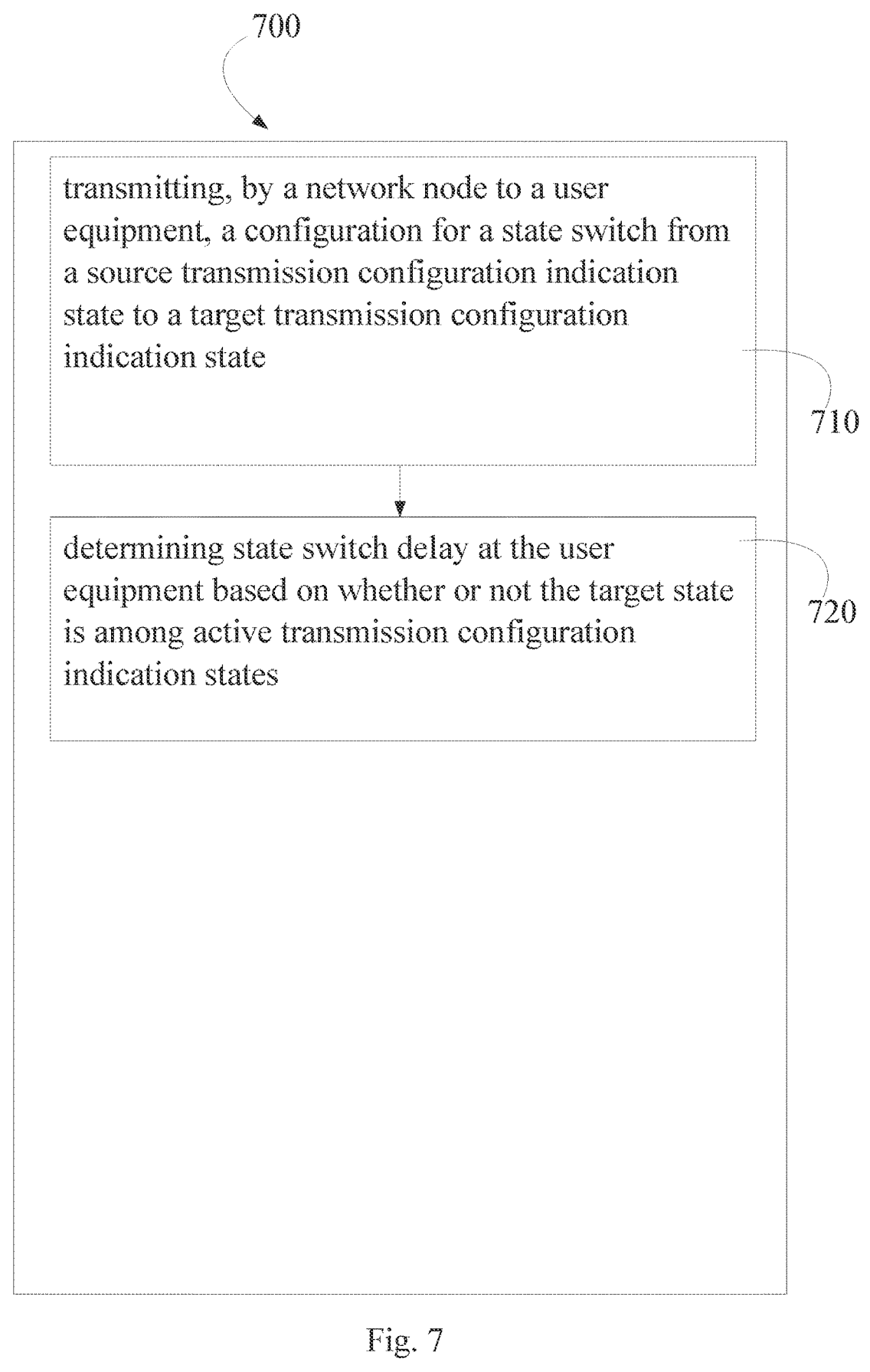

FIG. 7 shows, by way of example, a flowchart of a method. The method 700 may be performed by a user equipment, or by a control device configured to control the functioning thereof, when installed therein. The method 700 comprises transmitting 710, by a network node to a user equipment, a configuration for a state switch from a source transmission configuration indication state to a target transmission configuration indication state. The method 700 comprises determining 720 state switch delay at the user equipment based on whether or not the target state is among active transmission configuration indication states.

Figure 8:
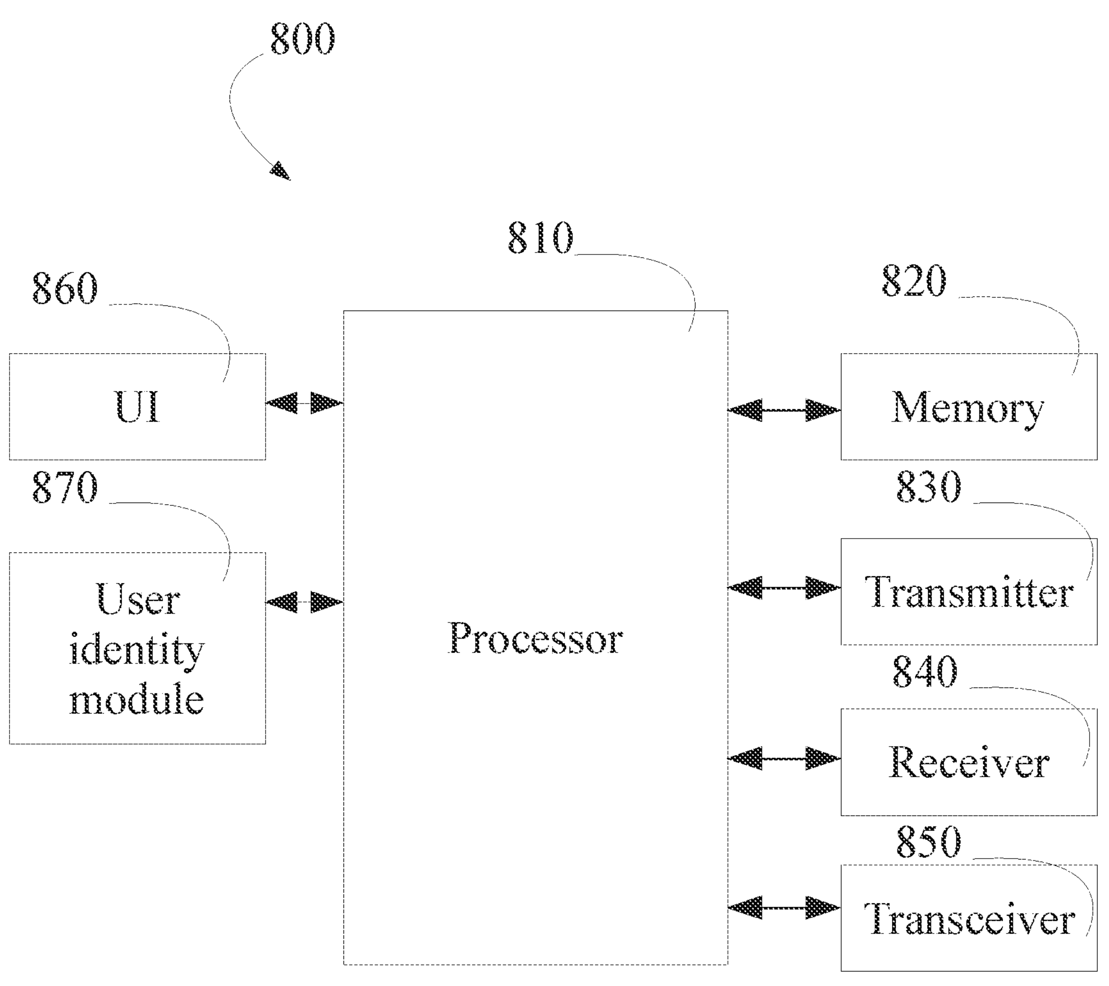
FIG. 8 shows, by way of example, a block diagram of an apparatus.

FIG. 8 shows, by way of example, a block diagram of an apparatus capable of performing the methods as disclosed herein. Illustrated is device 800, which may comprise, for example, a mobile communication device such as UE or customer premises equipment (CPE) or a network node, e.g. gNB. Comprised in device 800 is processor 810, which may comprise, for example, a single- or multi-core processor wherein a single-core processor comprises one processing core and a multi-core processor comprises more than one processing core. Processor 810 may comprise, in general, a control device. Processor 810 may comprise more than one processor. Processor 810 may be a control device. A processing core may comprise, for example, a Cortex-A8 processing core manufactured by ARM Holdings or a Steamroller processing core designed by Advanced Micro Devices Corporation. Processor 810 may comprise at least one Qualcomm Snapdragon and/or Intel Atom processor. Processor 810 may comprise at least one application-specific integrated circuit, ASIC. Processor 810 may comprise at least one field-programmable gate array, FPGA. Processor 810 may be means for performing method steps in device 800. Processor 810 may be configured, at least in part by computer instructions, to perform actions.

A processor may comprise circuitry, or be constituted as circuitry or circuitries, the circuitry or circuitries being configured to perform phases of methods in accordance with example embodiments described herein. As used in this application, the term "circuitry" may refer to one or more or all of the following: (a) hardware-only circuit implementations, such as implementations in only analog and/or digital circuitry, and (b) combinations of hardware circuits and software, such as, as applicable: (i) a combination of analog and/or digital hardware circuit(s) with software/firmware and (ii) any portions of hardware processor(s) with software (including digital signal processor(s)), software, and memory(ies) that work together to cause an apparatus, such as a user equipment or network node, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Device 800 may comprise memory 820. Memory 820 may comprise random-access memory and/or permanent memory. Memory 820 may comprise at least one RAM chip. Memory 820 may comprise solid-state, magnetic, optical and/or holographic memory, for example. Memory 820 may be at least in part accessible to processor 810. Memory 820 may be at least in part comprised in processor 810. Memory 820 may be means for storing information. Memory 820 may comprise computer instructions that processor 810 is configured to execute. When computer instructions configured to cause processor 810 to perform certain actions are stored in memory 820, and device 800 overall is configured to run under the direction of processor 810 using computer instructions from memory 820, processor 810 and/or its at least one processing core may be considered to be configured to perform said certain actions. Memory 820 may be at least in part external to device 800 but accessible to device 800.

Device 800 may comprise a transmitter 830. Device 800 may comprise a receiver 840. Transmitter 830 and receiver 840 may be configured to transmit and receive, respectively, information in accordance with at least one cellular or non-cellular standard. Transmitter 830 may comprise more than one transmitter. Receiver 840 may comprise more than one receiver. Transmitter 830 and/or receiver 840 may be configured to operate in accordance with global system for mobile communication, GSM, wideband code division multiple access, WCDMA, 5G, long term evolution, LTE, IS-95, wireless local area network, WLAN, Ethernet and/or worldwide interoperability for microwave access, WiMAX, standards, for example.

Device 800 may comprise a near-field communication, NFC, transceiver 850. NFC transceiver 850 may support at least one NFC technology, such as NFC, Bluetooth, Wibree or similar technologies.

Device 800 may comprise user interface, UI, 860. UI 860 may comprise at least one of a display, a keyboard, a touchscreen, a vibrator arranged to signal to a user by causing device 800 to vibrate, a speaker and a microphone. A user may be able to operate device 800 via UI 860, for example to accept incoming telephone calls, to originate telephone calls or video calls, to browse the Internet, to manage digital files stored in memory 820 or on a cloud accessible via transmitter 830 and receiver 840, or via NFC transceiver 850, and/or to play games.

Device 800 may comprise or be arranged to accept a user identity module 870. User identity module 870 may comprise, for example, a subscriber identity module, SIM, card installable in device 800. A user identity module 870 may comprise information identifying a subscription of a user of device 800. A user identity module 870 may comprise cryptographic information usable to verify the identity of a user of device 800 and/or to facilitate encryption of communicated information and billing of the user of device 800 for communication effected via device 800.

Processor 810 may be furnished with a transmitter arranged to output information from processor 810, via electrical leads internal to device 800, to other devices comprised in device 800. Such a transmitter may comprise a serial bus transmitter arranged to, for example, output information via at least one electrical lead to memory 820 for storage therein. Alternatively to a serial bus, the transmitter may comprise a parallel bus transmitter. Likewise processor 810 may comprise a receiver arranged to receive information in processor 810, via electrical leads internal to device 800, from other devices comprised in device 800. Such a receiver may comprise a serial bus receiver arranged to, for example, receive information via at least one electrical lead from receiver 840 for processing in processor 810. Alternatively to a serial bus, the receiver may comprise a parallel bus receiver.

Processor 810, memory 820, transmitter 830, receiver 840, NFC transceiver 850, UI 860 and/or user identity module 870 may be interconnected by electrical leads internal to device 800 in a multitude of different ways. For example, each of the aforementioned devices may be separately connected to a master bus internal to device 800, to allow for the devices to exchange information. However, as the skilled person will appreciate, this is only one example and depending on the embodiment various ways of interconnecting at least two of the aforementioned devices may be selected.

Figure 9:
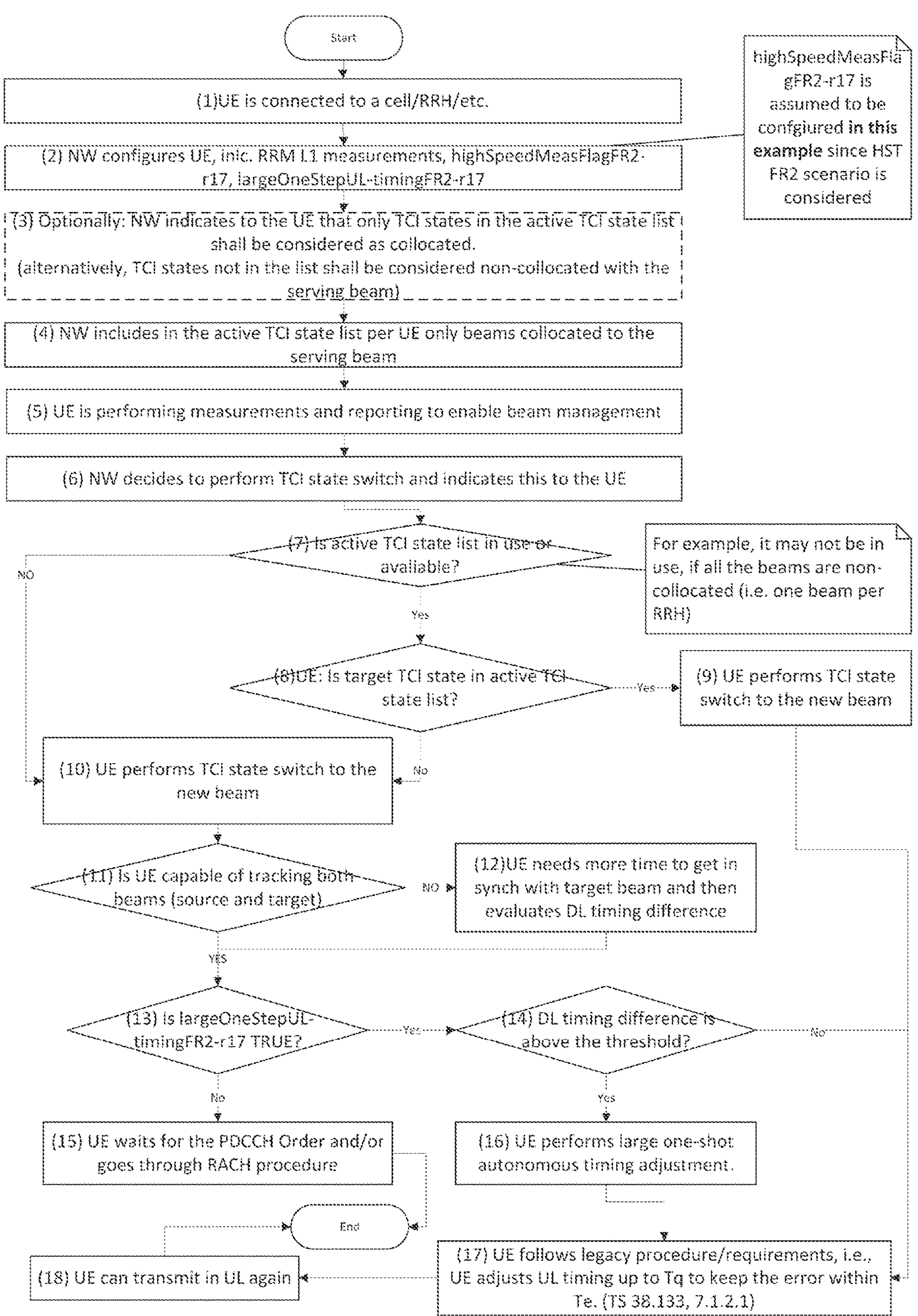
FIG. 9 shows, by way of example, a flowchart of a method.

FIG. 9 shows, by way of example, a flowchart of a method. In step 1, the UE is connected to a cell or to a remote radio head of a cell. In step 2, the network configures the UE to perform radio resource management (RRM) measurements. Further, the NW configures the UE with IE highSpeedMeasFlagFR2-r17, which may serve as an implicit indication that the UE is configured to determine whether the sources of the source TCI state and the target TCI state are collocation or not, as has been described above. Alternatively or additionally, such indication may be provided in step 3. The UE may also be configured to perform one-shot timing adjustment (as shown in step 2 via IE largeOneStepUL-timingFR2-r17).

In step 4 the NW may indicate in the active TCI state list only beams that are collocated with the current serving beam (i.e. with the source TCI state). In this way the network may control UE's actions. The TCI state that is not in the list is non-collocated with the current serving beam.

In step 5, the UE performs radio measurements, such as L1-RSRP measurements of beams and reports results of those to the network. In step 6, the network determines that TCI state switch is needed. This is indicated to the UE. For example, the UE may receive configuration for TCI state switch.

In step 7, the UE checks if the active TCI state list is in use or available. If there is only one beam per RRH, then each TCI state switch involves RRH change. In such case, there might not be a need for any active TCI list being used or being transmitted to the UE. In other words, the network may refrain from transmitting a list of the active TCI states to the UE. If there is no active TCI list in use, the method proceeds to step 10 where UE performs TCI state switch to a new beam (i.e. to target TCI state).

If there is an active TCI list in use, but it is detected in step 8 that the target TCI state is not among the active TCI state list, then, the method proceeds to step 10.

In step 11 it is determined if the UE is capable of tracking both source and target beams. If the answer to determination in step 11 is no, then the UE may need more time in step 12 to get in sync with the target beam and then the UE may evaluate the timing difference between source and target beams. If the answer to determination in step 11 is yes, the UE may be able to determine the timing difference between source and target beams quicker.

In step 13 it is determined if the largeOneStepUL-timingFR2-r17 possible. If not, the UE proceeds to step 15 where the UE waits for PDCCH and/or performs RACH procedure in order to perform time alignment. That is, the timing difference may be so large that the legacy mechanism (step 17) might not cover such a large change in UL timing.

If the result of the determination in step 11 is yes, then the method proceeds to step 14 where the UE determines if the timing difference between source and target beams is larger than a predetermined threshold. If it is, then the UE performs the large one-shot autonomous timing adjustment in step 16, and then proceeds to step 17 where the UE follows legacy procedure and/or requirements (i.e. adjusts UL timing to keep the timing error within specified limits). If, in step 14, it is determined that the timing difference between source and target beams is below the predetermined threshold, the UE proceeds to step 17 without going first to step 16. Then, in step 18, the UE may communicate with network.

If it is detected in step 8 that the target TCI state is among the active TCI state list (i.e. the source and target beams are collocated), then, the method proceeds to step 9 where the UE performs TCI state switch to a new beam (i.e. to target TCI state), and continues to step 17 and 18.

The invention claimed is:

1. An apparatus comprising at least one processor; and at least one memory storing instruction that, when executed by the at least one processor, cause the apparatus, which is configured to communicate on a source transmission configuration indication state, to:

receive, from a network using the source transmission configuration indication state, a configuration for a state switch from the source transmission configuration indication state to a target transmission configuration indication state;

determine that the apparatus is operated in a high-speed train frequency range 2 (HST FR2) scenario;

determine whether or not the target state is among active transmission configuration indication states;

determine a state switch delay based on determining that the apparatus is operated in the HST FR2 scenario and based on determining whether or not the target state is among the active transmission configuration indication states;

perform the state switch within the determined state switch delay; and based on receiving an indication that a one-time uplink timing adjustment is allowed, apply the one-time uplink timing adjustment after the state switch.

2. The apparatus of claim 1, wherein the apparatus is further caused to:

based on determining that the transmission point of the target state is among the active transmission configuration states, perform the state switch and re-use, in the target state, timing of the source state.

3. The apparatus of claim 2, wherein the apparatus is further caused to:

receive, in the target state, one or more configurations from the network according to timing requirements corresponding to the source state.

4. The apparatus of claim 1, wherein, when the target state is not among the active transmission configuration indication states and the user equipment operates in the HST FR2 scenario, the state switch delay comprises reception of a plurality of reference signals; and wherein the apparatus is further caused to:

perform fine time tracking in the target state based on the reception of the plurality of reference signals.

5. The apparatus of claim 1, wherein applying the one-time uplink timing adjustment is further based on determining that a downlink timing difference between the source active state and the target state is larger than a threshold.

6. The apparatus of claim 1, wherein the apparatus is further caused to:

based on determining that the target state is not among the active transmission configuration indication states, assume that a transmission point of the target state is not collocated with a transmission point of the source state, or based on determining that the target state is among the active transmission configuration indication states, assume that a transmission point of the target state is collocated with a transmission point of the source state; and determine the state switch delay based on whether or not the transmission point of the target state is assumed to be collocated with a transmission point of the source state.

7. The apparatus of claim 6, wherein the apparatus is further caused to:

receive an indication that the apparatus is configured to assume whether the transmission point of the target state is collocated with the transmission point of the source state based on determining whether the target state is among the active transmission configuration indication states.

8. The apparatus of claim 1, wherein the apparatus is further caused to:

based on determining that the target state is among the active transmission configuration indication states, continue data communication with the transmission point of the target state at a first time instant; or based on determining that the target state is not among the active transmission configuration indication states and based on determining that the apparatus is capable of fine time tracking, continue data communication with the transmission point of the target state at a second time instant, wherein the second time instant is after the first time instant; or based on determining that the target state is not among the active transmission configuration indication states and based on determining that the apparatus is not capable of fine time tracking, continue data communication with the transmission point of the target state at a third time instant, wherein the third time instant is after the second time instant.

9. The apparatus of claim 1, wherein the frequency range 2 (FR2) comprises a frequency above 24 GHz.

10. A method comprising: receiving, by a user equipment, from a network using a source transmission configuration indication state, a configuration for a state switch from the source transmission configuration indication state to a target transmission configuration indication state;

determining that the user equipment is operated in a high-speed train frequency range 2 (HST FR2) scenario;

determining whether or not the target state is among active transmission configuration indication states;

determining a state switch delay based on determining that the apparatus is operated in the HST FR2 scenario and based on determining whether or not the target state is among the active transmission configuration indication states; and performing the state switch within the determined state switch delay; and based on receiving an indication that a one-time uplink timing adjustment is allowed, applying the one-time uplink timing adjustment after the state switch.

11. The method of claim 10, wherein, when the target state is not among the active transmission configuration indication states and the user equipment operates in the HST FR2 scenario, the state switch delay comprises reception of a plurality of reference signals; and the method further comprises: performing fine time tracking in the target state based on the reception of the plurality of reference signals.

12. The method of claim 10, wherein applying the one-time uplink timing adjustment is further based on determining that a downlink timing difference between the source active state and the target state is larger than a threshold.

13. The method of claim 10, further comprising: based on determining that the target state is not among the active transmission configuration indication states, assuming that a transmission point of the target state is not collocated with a transmission point of the source state, or based on determining that the target state is among the active transmission configuration indication states, assuming that a transmission point of the target state is collocated with a transmission point of the source state; and determining the state switch delay based on whether or not the transmission point of the target state is assumed to be collocated with a transmission point of the source state.

14. The method of claim 10, wherein the frequency range 2 (FR2) comprises a frequency above 24 GHz.

* * * * *